(No Model.)
H. A. MOYER.
SPRING VEHICLE.
No. 373,375. Patented Nov. 15, 1887.
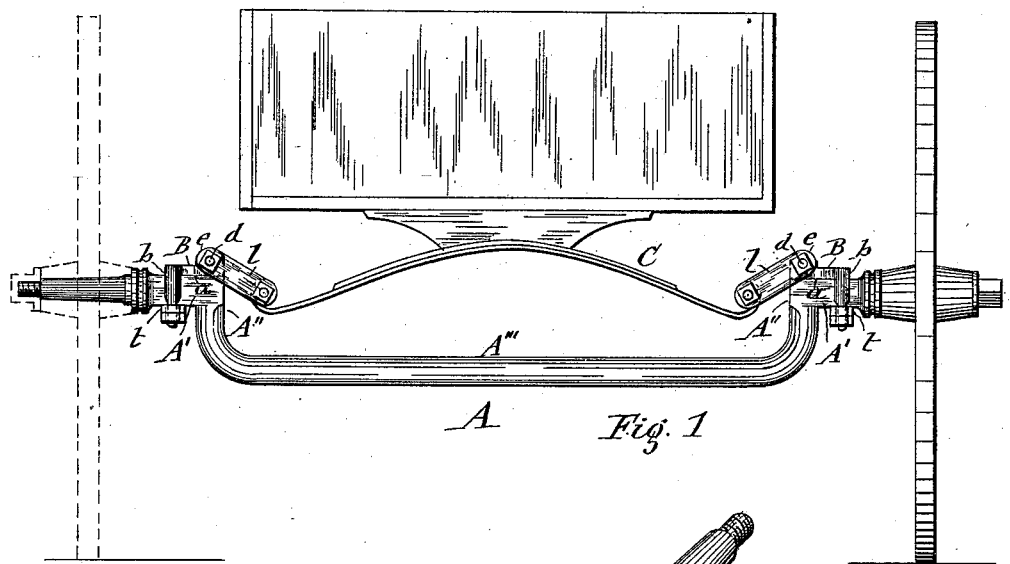
Fig. 1
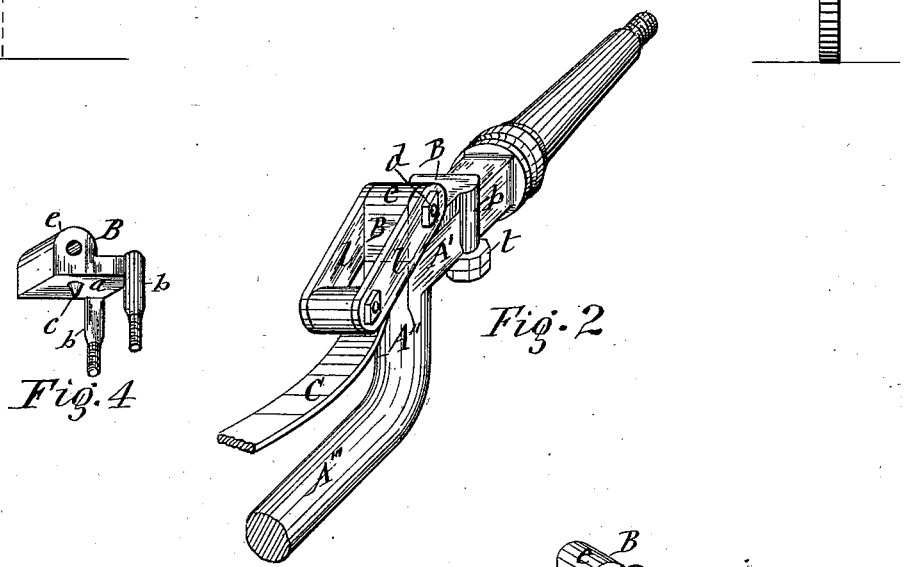
Fig. 4  Fig. 2
Fig. 3
WITNESSES:
H. P. Denison.
C. Bendixon
INVENTOR
Harvey A. Moyer
BY
Duell, Laass & Duell
ATTORNEYS

UNITED STATES PATENT OFFICE.

HARVEY A. MOYER, OF SYRACUSE, NEW YORK.

SPRING-VEHICLE.

SPECIFICATION forming part of Letters Patent No. 373,375, dated November 15, 1887.

Application filed July 5, 1887. Serial No. 243,330. (No model.)

*To all whom it may concern:*

Be it known that I, HARVEY A. MOYER, of Syracuse, in the county of Onondaga, in the State of New York, have invented new and useful Improvements in Spring-Vehicles, of which the following, taken in connection with the accompanying drawings, is a full, clear, and exact description.

This invention relates to the class of vehicles in which a cross-spring is hung on the axle and supported in the same vertical plane therewith; and the invention consists in improved devices for hanging the spring on the axle, as hereinafter described, and specifically set forth in the claims.

In the annexed drawings, Figure 1 is a rear end elevation of a spring-vehicle embodying my improvements. Fig. 2 is an enlarged perspective view of an end portion of the axle and spring hung thereon. Fig. 3 is another enlarged perspective view of the end portion of the axle with my improved spring-supporting block mounted thereon, and Fig. 4 is a detached perspective view of the said spring-supporting block.

Similar letters of reference indicate corresponding parts.

A denotes the axle, which is formed with the horizontal end portions A' A', depressed central portion A''', and abrupt downward deflections or offsets A'' A'', joining the aforesaid central portion to the end portions.

Upon the end portions A' A', I mount the blocks B B, each of which latter is formed at its under side with a bearing, $a$, extending from end to end of the block and resting on the axle portion A', so as to bring the inner end of the bearing $a$ flush with the top edge of the offset A''. Each block B is also formed at its outer end with a clip or clip-shanks, $b\ b$, which project from the side edges of the block and are integral therewith. Said clip-shanks straddle the axle, and are fastened in the usual manner by a clip-tie, $t$, placed across the under side of the axle. The opposite or inner end of the block I provide at its under side with a lug, $c$, which enters an indentation or countersink in the top of the axle portion A', and thereby effectually prevents the block from slipping on the axle. Said end of the block B is formed with an eye, $e$, extending transversely through it, and through said eye passes a bolt, $d$, on the ends of which are hung the shackles or links $l\ l$, between the vibratory ends of which is carried the coupling-eye of the spring C, which is secured to said links by a bolt passing through said parts in the usual manner. I do not, however, limit myself to the use of the eye $e$ on the block B, with a bolt passing through said eye, inasmuch as the coupling-bolt may be made integral with the block B.

It will be observed that by my improved construction of the spring-supporting blocks B B and their attachment to the axle by clips formed integral with said blocks I render the same perfectly secure, compact, and neat in appearance, and by arranging the shackle-eye $e$ directly over the inner end of the axle portion A', with a firm bearing on the latter, said shackle-eye is supported in the most secure manner, and the spring C is carried very low.

Having described my invention, what I claim as new, and desire to secure by Letters Patent, is—

1. In combination with the axle formed with the horizontal end portions A' A' and abrupt downward-deflected portions A'' A'' and the cross-spring C over said axle, the blocks B B, secured to the top of the horizontal portions A' A', and formed with the eye $e$ directly over the axle portion A'', and shackles connecting the ends of the spring to the eyes of the aforesaid blocks, substantially as set forth and shown.

2. In combination with the axle formed with the horizontal end portions A' A' and abrupt downward-deflected portions A'' A'' and the cross-spring C over the axle, the blocks B B, formed with the bearing $a$, extending from end to end of the block and seated on top of the end portion A', with the end of the bearing $a$ flush with the top edge of the offset A'', and formed with the eye $e$ directly over the axle portion A'', and in one piece with the block, and links $l\ l$, connecting the spring with the eye $e$, substantially as described and shown.

3. In combination with the axle formed with the horizontal end portions A' A' and abrupt downwardly-deflected portions A'' A'' and the cross-spring over said axle, the blocks B B, formed with the bearing $a$, extending from end to end of the block and seated on top of the end portion A', with the end of the bearing flush with the top edge of the offset A″, and formed also with the eye $e$ directly over the axle portion A″, and with the clip-shanks $b\ b$ all in one piece, substantially as described and shown.

In testimony whereof I have hereunto signed my name, in the presence of two witnesses, at Syracuse, in the county of Onondaga, in the State of New York, this 1st day of July, 1887.

HARVEY A. MOYER. [L. S.]

Witnesses:
H. P. DENISON,
C. BENDIXON.